United States Patent [19]

Seymour et al.

[11] Patent Number: 4,568,147
[45] Date of Patent: Feb. 4, 1984

[54] FLAT PROFILE GRATING COUPLER

[75] Inventors: Robert J. Seymour, Wellesley Hills; Donald M. Koffman, Winchester, both of Mass.

[73] Assignee: GTE Laboratories Incorporated, Waltham, Mass.

[21] Appl. No.: 552,873

[22] Filed: Nov. 17, 1983

[51] Int. Cl.$^4$ .............................................. G02B 5/18
[52] U.S. Cl. ............................... 350/162.17; 350/1.1; 350/96.19; 350/162.2
[58] Field of Search .................. 350/96.15, 96.19, 1.1, 350/162.11, 162.17, 162.2

[56] References Cited

U.S. PATENT DOCUMENTS

| | | | |
|---|---|---|---|
| 3,650,594 | 3/1972 | Nassenstein | 350/162.2 X |
| 3,788,728 | 1/1974 | Nassenstein et al. | 350/162.11 X |
| 4,397,558 | 8/1983 | Hill et al. | 350/162.17 X |
| 4,492,738 | 1/1985 | Cline | 350/162.17 X |
| 4,496,634 | 1/1985 | Cline | 350/162.17 X |

Primary Examiner—John Lee
Attorney, Agent, or Firm—Fred Fisher

[57] ABSTRACT

A device for efficiently coupling electromagnetic radiation in the far-infrared and submillimeter microwave regions of the electromagnetic spectrum to surface electromagnetic waves comprising a base metal substrate formed by producing periodic alternating areas thereof in which the dielectric constants differ so as to provide periodic field modulation to, in turn, enhance coupling between the surface plasmons and free photons at the proper coupling angles. The different dielectric constant areas may be formed by selective overplating or evaporating or may alternately be formed by the selective processing of a uniformly deposited material such as by annealing of an amorphous material in strips. In an alternate embodiment of the invention the periodic modulation of the dielectric constant is of the overcoat material rather than the base metal substrate.

3 Claims, 2 Drawing Figures

FLAT PROFILE GRATING COUPLER

BACKGROUND OF THE INVENTION

The present invention relates in general to optical devices, and is concerned, more particularly, with a flat profile grating coupler for use in coupling free electromagnetic radiation to surface electromagnetic waves generated in the grating.

It is well known that in the visible region of the electromagnetic spectrum it is possible to couple essentially all of the bulk electromagnetic wave incident to a metal surface into a surface electromagnetic wave (SEW) or surface plasmon wave within the metal. (For a detailed discussion of surface plasmons see, for example, E. Burstein et al., *J. Vac. Sci. Technol.*, Vol. 11, No. 6, pp. 1004–1019, 1974.)

However, as the wavelength of the incident radiation increases into the infrared region of the spectrum and beyond, efficient coupling between the incident radiation and the surface plasmon becomes more difficult. This is due to increasing delocalization of the electromagnetic field away from the interface and the corresponding decrease in the proportion of the field within the metal as wavelength increases.

Z. Schlesinger et al. have discussed in *Solid State Commun.* Vol. 38, pp. 1035–1039, 1981, the phenomenon of coupling between far-infrared radiation and surface plasmons in germanium coated gold or lead surfaces. In a doctoral dissertation submitted to the University of Missouri at Rolla in 1975 and entitled, "Excitation of Surface Electromagnetic Waves at Microwave Frequencies Using Optical Techniques," M. Davarpanah has described the coupling of microwave radiation into a coated metal surface in devices which employ metal rods placed over the coating.

In co-pending application Ser. No. 474,222 filed Mar. 11, 1983 there is described a grating surface plasmon coupler in which there is provided a metal material of negative dielectric constant, the surface of which has been contoured into a grating structure. The grating surface has a repeating structure preferably with a periodicity greater than the wavelength of the electromagnetic radiation (EMR) impinging upon the metal material. Although the coupler described in application Ser. No. 474,222 provides efficient coupling, such couplers are not readily adapted to applications that might require any bending or flexing of the coupler.

Also, with presently existing grating surface plasmon couplers there is the need to provide a multiple step operation in order to form the grating contoured surface. For example, this typically involves the use of a silicon wafer which is coated with a thin layer of phosphorous glass which in turn has deposited thereover a metallic layer such as one of silver to finally produce the metal grating surface.

OBJECTS AND SUMMARY OF THE INVENTION

It is therefore an object of the present invention to provide a device which efficiently couples electromagnetic radiation in the far-infrared and the sub-millimeter regions of the electromagnetic spectrum with surface plasmon waves on a metal.

It is a further object of the present invention to provide a device in accordance with the preceding object and which is easily and inexpensively fabricated.

It is yet another object of the present invention to provide devices for coupling electromagnetic radiation into surface electromagnetic waves which devices can be effectively fabricated so as to be rugged in construction and which can be fabricated by techniques presently known in the semiconductor or metal fabrication art.

It is still another object of the present invention to provide a flat profile grating coupler which is of rugged construction and which can easily withstand distortion, bending or the like.

Still another object of the present invention is to provide a grating type coupler which is particularly fabricated in flat form and which is more easily fabricated than previously known constructions of grating type couplers particularly those having a grating contoured surface.

Still another object of the present invention is to provide a device for coupling electromagnetic radiation into surface electromagnetic waves and in which the grating is formed, not by providing a physically contoured surface but by other means to be described hereinafter that can carried out more easily to thus make the overall fabrication technique more simplified.

To accomplish the foregoing and other objects and advantages of this invention there is provided a flat profile grating coupler comprising a metal or alloy substrate formed by producing periodic alternating areas of the surface active media in which the negative dielectric constant cyclically differs. This results in a modulation at the field penetration distance in the upper dielectric (for example, air). The periodic field modulation causes coupling between the surface plasmons and free photons at the proper coupling angles. The aforementioned areas or regions of varying dielectric constant may be produced by a number of different techniques in accordance with the present invention. Different metals or alloys may be deposited by standard techniques. This may be carried out, for example, by selectively overplating or evaporating of the alternating dielectric constant metals. A second technique is to selectively process a uniformly deposited material such as by annealing an amorphous material to cause selective crystallization. In either of the above examples the formed structure may be overcoated with a dielectric layer to enhance the coupling efficiency. Lastly it is possible to achieve the same effect by periodically modulating the dielectric constant of the overcoated material rather than the base substrate. This can be accomplished by embedding high dielectric constant material such as silicon in a low dielectric constant material such as polyethylene. If this injection is done periodically it will have the same effect as in the techniques described above with a periodically modulated field penetration.

BRIEF DESCRIPTION OF THE DRAWINGS

Numerous other objects, features and advantages of the invention should now become apparent upon a reading of the following detailed description taken in conjunction with the accompanying drawing in which.

DETAILED DESCRIPTION

Grating plasmon wave coupling devices in accordance with the present invention are useful for coupling electromagnetic radiation (EMR) into surface plasmon waves in the device. Presently existing grating surface plasmon couplers such as described in the aforementioned application Ser. No. 474,222 may comprise a material of negative dielectric constant, the surface of which has been contoured into a grating surface. Metals such as aluminum, nickel, copper, zinc, palladium, silver, cadmium, platinum, gold and mixtures or alloys of these metals are effective for such use. The grating surface itself physically has a repeating structure with a periodicity greater than the wavelength of the electromagnetic radiation (EMR) impinging on the device. Now, in accordance with the present invention the grating is accomplished, not by physical contouring of the surface but instead by producing periodic alternating areas of the surface in which the dielectric constant differs, thus providing a flat profile grating coupler. The concepts of the present invention enable the construction of a rugged coupler that can withstand distortions of the substrate. The coupler of this invention also readily handles bending or other stresses due primarily to its capability of more rugged construction in comparison with prior grating surface plasmon couplers.

Figure 1:
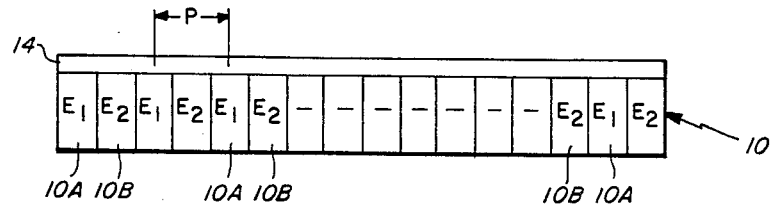
FIG. 1 schematically depicts one version in accordance with the present invention and in which dielectric constants are cyclically varied in the substrate.

The flat profile grating coupler in accordance with the invention comprises a metal substrate to which a dielectric overcoat may be applied. The metal material is formed by producing periodic alternating areas of the surface active media with negative dielectric constants that differ. This results in a modulation at the field penetration distance in the upper dielectric which may include the dielectric overcoat and the air thereabove. The periodic field modulation causes coupling between the surface plasmon and free photons at the proper coupling angles. FIG. 1 shows one embodiment in accordance with the present invention including a metal substrate 10 having deposited thereover a dielectric overcoat 14. The dielectric overcoat may be formed by well-known techniques. The dielectric overcoat layer 14 may be formed of organopolymers which are transparent to far-infrared or submillimeter microwave electromagnetic radiation (EMR). This layer may include saturated hydrocarbon or halogen substituted saturated hydrocarbon polymers. Preferred materials include polyethylene, polytetrafluoroethylene, polyisobutylethylene, and the like.

As indicated in FIG. 1, the metal or metal alloy substrate 10 is schematically depicted as having periodic alternating areas 10A and 10B. In FIG. 1 the area 10A is illustrated as being of dielectric constant $\epsilon_1$ and the area 10B is illustrated as having a dielectric constant $\epsilon_2$. These different dielectric constant areas alternate as illustrated in FIG. 1. The periodicity P is to be greater than the operating wavelength. The periodicity P is dependent upon both wavelength and incident angle. The differing areas 10A and 10B may be deposited by various standard deposition techniques. For example, these areas can be formed by selective overplating or by vapor depostion of alternate metals. For example the area 10A may be formed by depositing silver and the area 10B may be formed by depositing lead.

In accordance with another technique of the present invention one may start with a base metal substrate and then provide selective processing of this uniformly deposited substrate. For example, amorphous material can be annealed in strips to provide selective crystallization. As illustrated in FIG. 1 by this technique the annealed portions may correspond to the area 10B and the portions intermediate the annealing may correspond to the area 10A. In either of these techniques the structure may be overcoated as illustrated in FIG. 1 by the layer 14. This dielectric overcoat provides enhancement of the coupling efficiency.

Figure 2:
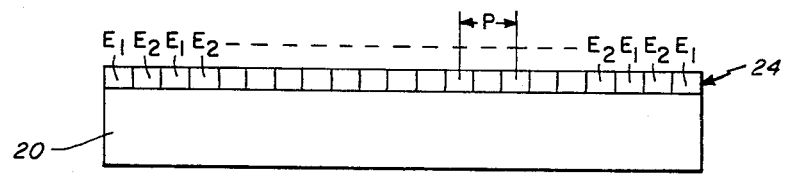
FIG. 2 schematically depicts an alternate version of the invention in which the dielectric constant variations occur in the overcoat layer.

In an alternate embodiment of the present invention the same effect may be achieved as referred to hereinbefore by periodically modulating the dielectric constant of the overcoat material. In this regard refer to FIG. 2 which shows the base metal substrate 20 and the dielectric overcoat 24. The overcoat layer 24 is also schematically illustrated as being formed into periodic alternating areas identified in FIG. 2 having alternating dielectric constants $\epsilon_1$, $\epsilon_2$, $\epsilon_1$, $\epsilon_2$, 2, etc. These alternating dielectric constant areas may be formed by embedding high dielectric constant material such as silicon in a low dielectric constant material such as polyethelene. If this injection is done at a periodicity of P there is provided the same effect as in the previous embodiments with a periodically modulated field penetration.

While there have been shown and described what are at present to be the preferred embodiments of the present invention, it will be obvious to one skilled in the art that various changes and modifications may be made herein without departing from the scope of the invention as defined by the appended claims.

What is claimed is:

1. A flat profile grating coupler comprising, a substrate forming an active media for coupling free electromagnetic radiation to surface plasmon waves, and a dielectric overcoat layer on said substrate, said dielectric overcoat layer having means defining alternate areas of differing dielectric constants at a repeatable predetermined periodicity for establishing a corresponding signal modulation of the field penetration distance.

2. A flat profile grating coupler as set forth in claim 1 wherein said means defining alternating areas of differing dielectric constant includes a low dielectric constant material periodically embedded with a high dielectric constant material.

3. A flat profile grating coupler as set forth in claim 2 wherein said low dielectric constant material is polyethylene and said high dielectric constant material is silicon.

* * * * *

UNITED STATES PATENT AND TRADEMARK OFFICE
CERTIFICATE OF CORRECTION

PATENT NO. : 4,568,147

DATED : February 4, 1986

INVENTOR(S) : Robert J. Seymour et al

It is certified that error appears in the above-identified patent and that said Letters Patent is hereby corrected as shown below:

On the title page Item (45), "Feb. 4, 1984" should read -- Feb. 4, 1986 --.

Signed and Sealed this

Tenth Day of June 1986

[SEAL]

Attest:

DONALD J. QUIGG

Attesting Officer

Commissioner of Patents and Trademarks